United States Patent [19]
Sorensen et al.

[11] 3,867,064
[45] Feb. 18, 1975

[54] FORAGE BLOWER OUTLET
[75] Inventors: Robert Sorensen, Glen Ellyn; Thomas J. Scarnato, Barrington; N. Donald Patterson, Downers Grove, all of Ill.
[73] Assignee: International Harvester Company, Chicago, Ill.
[22] Filed: Aug. 27, 1973
[21] Appl. No.: 392,155

[52] U.S. Cl. ......... 415/201, 415/219 C, 415/219 B, 302/37
[51] Int. Cl. ............................................ F04d 29/40
[58] Field of Search ............ 415/201, 219 C, 219 B, 415/206; 302/37; 56/13.3, 13.4

[56] References Cited
UNITED STATES PATENTS
1,609,545    12/1926    Hanf ............................... 415/219 C
1,825,838    10/1931    Wessman ............................. 302/37
2,564,930    8/1951     Slavicek ............................. 302/37
3,145,063    8/1964     Kools ................................ 302/37
3,466,095    9/1969     Weihmuller ......................... 302/37

Primary Examiner—Henry F. Raduazo
Attorney, Agent, or Firm—Dennis K. Sullivan; Floyd B. Harman

[57]    ABSTRACT

A housing for a forage blower is provided with a two piece blower outlet assembly having a base member connecting the ends of the circumferential housing band and a blower outlet mounted to the base member, at least a portion thereof being detachable from the base member to permit access to the interior of the housing without releasing the housing band clamp.

5 Claims, 5 Drawing Figures

PATENTED FEB 18 1975 3,867,064
SHEET 1 OF 2
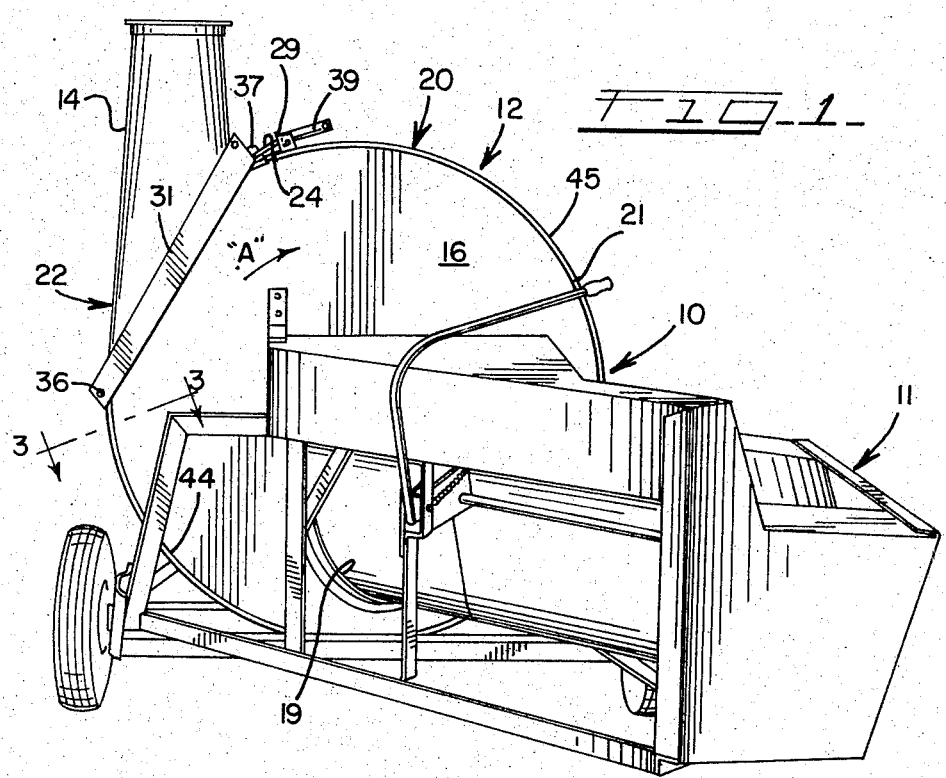
FIG_1_
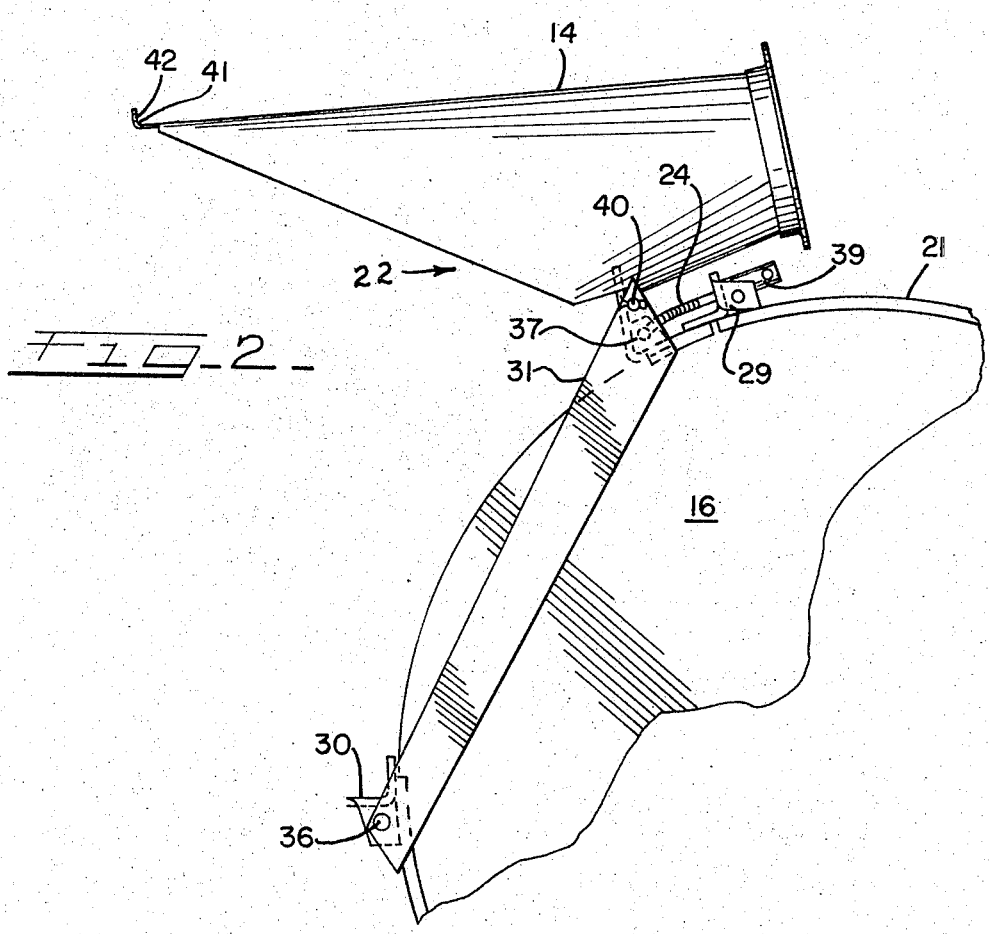
FIG_2_

3,867,064

FORAGE BLOWER OUTLET

This application is related to application Ser. No. 391,910, now U.S. Pat. No. 3,843,280, Oct. 22, 1974 of Donald A. Picka, which patent is assigned to the assignee hereof.

BACKGROUND OF THE INVENTION

This invention relates to forage blowers and more particularly, to a blower outlet assembly for the housing thereof.

The housing typically used on most forage blowers today comprises a pair of substantially circular side sheets in which a paddled impeller is journalled, one of the side sheets having a crop inlet opening. A peripheral wall is clamped against the outside of the side sheets to enclose the housing, the peripheral wall consisting of a band enclosing most of the housing and a tangential blower outlet section which is hinged or bolted to one end of the band and clamped to the other end. The blower outlet generally discharges the crop vertically, although it may be arranged, due to the clamped connection of the band and blower outlet against the side sheets, to discharge in any direction in the plane of the impeller.

While this housing arrangement has been found to be quite satisfactory, as attested to by its wide adoption in the industry, it also presents some problems. One of these is that in order to open the blower outlet to gain access to the interior of the housing, the clamped connection between the outlet section and the housing band must be released. When the band is released, it is suseptible to having crop material fall in the grooves in the housing band (see FIG. 3) which mate with the outside edge of the side sheets. If this material is not cleared out before the band is reclamped against the housing, it will not seat properly causing excess clearance between the impeller paddles and the housing band which will result in a loss of blower efficiency.

The critical areas of paddle clearance are at the bottom of the housing and on the side just below the outlet section. This raises a further difficultly of this prior art housing design since when the clearance between the impeller paddles and the rotor housing is measured and/or adjusted, the band must be clamped in place. Access to measure bottom clearance is relatively convenient through the crop inlet in the side sheet. However, in order to gain access to measure the side clearance, one must reach through the top of the blower outlet which is inconvenient and cumbersome.

Accordingly, it is an object of the invention disclosed herein to provide a housing for a forage blower wherein the blower outlet may be hinged open or removed to gain access to the housing interior for inspection, clean out, or measurement without releasing the clamped connection of the housing band against the side sheets.

Specifically, it is proposed to provide a blower outlet assembly having a base member which provides the connection of the ends of the side sheets and a blower outlet displaceably mounted thereon, preferably hinged to the base member on one end and releasably attached at the other end, to permit displacement of the outlet from the base member to provide access to the housing interior.

BRIEF DESCRIPTION OF THE DRAWINGS

Other objects and advantages of the invention will become apparent upon reading the following detailed description and upon reference to the drawings in which:

FIG. 1 is a side elevational view of a forage blower incorporating the present invention;

FIG. 2 is an enlarged side view of a portion of the forage blower of FIG. 1 showing the blower outlet displaced from the base member to provide access to the housing interior;

Figure 4:
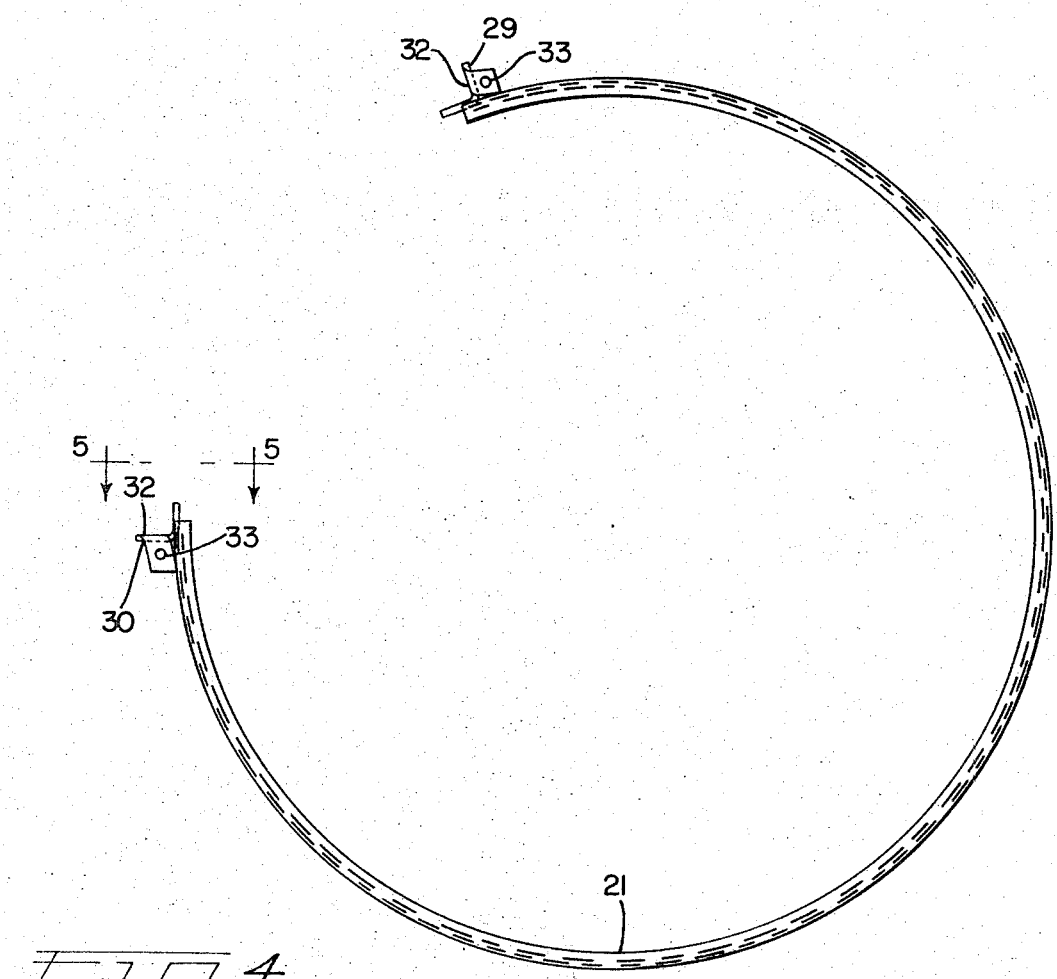
FIG. 4 is a side view of the housing band used in the present invention.

While the invention will be described in connection with a preferred embodiment, it will be understood that it is not intended to limit the invention to that embodiment. On the contrary it is intended to cover all alternatives, modifications, and equivalents that may be included within the spirit and scope of the invention as defined by the appended claims.

DETAILED DESCRIPTION OF THE INVENTION

Turning first to FIG. 1, there is shown a forage blower generally designated 10 having a crop receiving receptable generally designated 11 from which crops are fed into a cylindrical impeller housing generally designated 12 in which an impeller generally designated 13 is journalled. When the impeller is rotated in a direction shown in FIG. 1 as "A" by a suitable source of power, such as a tractor P.T.O., crops fed into the blower from the receptacle 11 are expelled out of the blower outlet 14 and may be propelled, for example, through a tube (not shown) connected to the blower outlet 14 and carried up to the top of a silo. All of the previous structure is quite well known to those skilled in the art and is described merely for the purpose of providing an environment for the invention. For those interested in a complete description of such a blower, reference may be had to U.S. Pat. No. 3,302,978 "Diagonal Feed Material Conveyor and Blower Mechanism", to Thomas J. Scarnato et al., in which a complete description of such a blower is furnished.

The blower housing 12 comprises a pair of laterally spaced vertical substantially circular side sheets 16 and 17, the side sheet 16 having a crop inlet opening 19. An annular peripheral wall 20, which comprises a housing band 21 and a blower outlet assembly 22 connected in end to end relationship, is wrapped about the peripheral edges of the side sheets 16 and 17 and is clamped thereagainst by means of clamp 24, the blower outlet 14 being generally oriented in a vertical position as shown.

Figure 5:
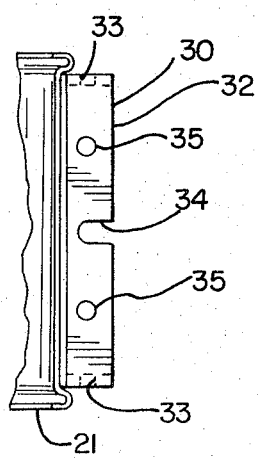
FIG. 5 is an enlarged view of the band flanges shown on the band in FIG. 4 and taken along the line 5—5 thereof.
Figure 3:
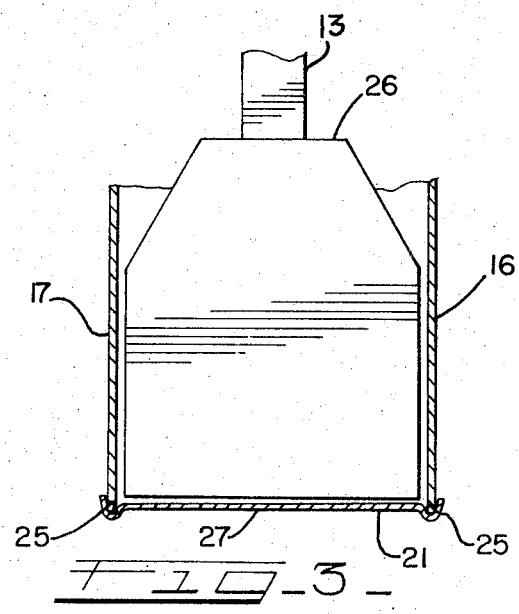
FIG. 3 is a sectional view of the blower shown in FIG. 1 taken along the line 3—3 thereof and illustrating the relationship of the side sheets housing band and impeller paddle.

The housing band 21, as best seen in FIGS. 3, 4, and 5 has a pair of grooves 25 receiving the side sheets 16 and 17 to maintain the clearance between the side sheets and the impeller paddles 26. Between the grooves 25, the band 21 has an intermediate portion 27 parallel to and closely spaced to the periphery defined by the paddles 26, the clearance being about 1/16 inch at the housing bottom opening to about 3/32 inch on the outlet side in accordance with the art. The housing band 21 is bent into a circular form and has a pair of identical flanges 29 and 30 affixed to each end symmetrically about the gap for connecting the band 21 to the base member 31 of the blower outlet assembly 22. As best seen in FIGS. 4 and 5, the flanges 29 and 30 have a leg 32 radial to the band the ends of which are bent in the longitudinal direction of the band, each end being provided with one of a pair of transverse coaxial holes 33 therein. At the center of the leg 32, the flanges 29 and 30 have a U-shaped opening 34 and a pair of holes 35 disposed on either side thereof with their axes in the longitudinal direction. Since the flanges 29 and 30 are identical, the band may be reversed end for end with respect to the base member 31, thereby enabling the portion of the housing band in the high wear area 44 to be relocated in the low wear area 45.

When the parts are arranged as shown in the drawings, the base member 31 which is U-shaped and has a hole 36 at the distal end of each leg, is pivotally connected to the flange 30 by means of pins or bolts extending through the holes 36 and the holes 33 of the flange 30, thereby forming a hinge therebetween. The opposite end of the base member 31 is provided with a flange 37 which receives one end of the clamp 24. In clamping the base member 31 and band 21 together against the side sheets 16 and 17, the clamp 24 is inserted in the U-shaped opening 34 in the flange 29, the end 39 of the clamp 24 being screwed down until the parts are tightly clamped. As may be seen from FIG. 2, the base member 31 together with side sheets 16 and 17 in the circumferential band 21 thus define the outlet opening in the peripheral wall 20 adjacent the periphery of the side sheets.

The blower outlet 14 is hinged to the base member 31 by means of a transverse pin 40 extending through suitable holes in the outlet and in the base member 31 above the clamp flange 37 and is free to pivot thereabout. To secure the blower outlet 14 in the closed position, the free end of the blower outlet 14 has an outturned flange 41 which is secured against the clamp 30 by means of bolts (not shown) extending through holes 42 in the flange 41 and the holes 35 in the band flange 30. Thus the blower outlet 14 may be opened for inspection without releasing the clamping on the band 21 by removing the bolts from the holes 42 and 35 and pivotally displacing the blower outlet 14 away from the base member 31 thereby permitting easy access to the interior of the housing 12.

Thus it is apparent that there has been provided, in accordance with the invention, a forage blower housing that fully satisfies the objects, aims, and advantages set forth above.

What is claimed is:

1. In a housing for a forage blower, said housing comprising a pair of laterally spaced side sheets, one of said side sheets having a crop inlet, and an annular peripheral wall adapted to be clamped against said side sheets, said peripheral wall comprising outlet means and a circumferential band, the improvement wherein said outlet means comprises a base member connected in end to end relationship with said band, said base member, side sheets, and circumferential band defining an opening in said peripheral wall adjacent the periphery of said side sheets, and a blower outlet having a portion removably attached to said base member, said blower outlet being displaceable from said base member to permit access to the interior of said housing while said peripheral wall remains clamped against said side sheets.

2. The invention in accordance with claim 1 wherein said blower outlet is hinged to said base member at one end thereof and removably attached at the other end of said base member.

3. The invention in accordance with claim 1 wherein said base member is pivotally attached to one end of said band and is clampingly attached to the other end of said band.

4. An impeller housing for a forage blower comprising a pair of laterally spaced circular side sheets, one of said side sheets having a crop inlet, a partially circumferential band overlapping the peripheral edges of said side sheets, a base member connected in end to end relationship with said band, said base member having an opening therein defining a crop outlet adjacent the periphery of said side sheets, said base member and said band having cooperating means providing a clamping connection therebetween to secure said band in clamped relationship against said side sheets, and a blower outlet displaceably secured to said base member, said blower outlet being displaceable therefrom to permit access to the interior of said housing while maintaining said clamping connection.

5. The invention in accordance with claim 4 wherein said blower outlet is hinged to said base member at one end thereof and removably attached at the other end of said base member.

* * * * *